Patented Feb. 6, 1951

2,540,267

UNITED STATES PATENT OFFICE 2,540,267

ESTERS OF ACETOETHYL-MALONIC ACIDS AND PROCESS

Bernard H. Kress, Morristown, N. J., assignor to Celanese Corporation of America, a corporation of Delaware No Drawing. Application July 23, 1948,
Serial No. 40,429

2 Claims. (Cl. 260—483)

This invention relates to the production of keto compounds, and relates more particularly to the production of certain novel keto compounds by the catalytic condensation of an alpha-unsaturated ketone with an organic compound having labile hydrogen whereby the reactive hydrogen is replaced and a keto-containing group substituted therefor with the formation of a carbon to carbon linkage.

An object of this invention is the provision of an efficient and economical process for the production of novel keto compounds.

Another object of this invention is to provide a process which is adapted to be employed in the preparation of novel keto compounds, which process comprises reacting a ketone having an unsaturated group in alpha position to the carbonyl group with an organic compound containing a labile hydrogen atom.

A further object of this invention is the preparation of novel organic compounds wherein methyl vinyl ketone is reacted with certain organic compounds having reactive hydrogen in the molecule whereby an acetoethyl group is introduced into said compounds by replacement of one or more of the reactive hydrogen atoms present.

Other objects of this invention will appear from the following detailed description.

I have found that if an alpha-unsaturated ketone is reacted in the presence of a basic catalyst with an organic compound containing a labile or reactive hydrogen linked directly to carbon, the reactive hydrogen is removed, a carbon to carbon linkage formed at the unsaturated bond of the ketone and novel keto compounds are thereby obtained. Thus, for example, when the unsaturated ketone employed is methyl vinyl ketone, the reactive hydrogen is replaced by an acetoethyl group, viz.,

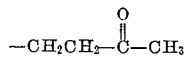

The reaction is a generic one and is operative to form a carbon to carbon linkage where the organic compound reacted contains a reactive hydrogen atom linked to carbon.

As examples of other alpha-unsaturated ketones which may be employed in said reaction, there may be mentioned isopropenyl methyl ketone, isopropenyl ethyl ketone, phenyl vinyl ketone, ethyl vinyl ketone, mesityl oxide, etc.

Compounds having labile hydrogen wherein the hydrogens are easily replaceable in accordance with my novel process, are exemplified by many classes of compounds. The labile hydrogen may be attached to a carbon atom which also carries a negative group, such as a nitro group, in addition to hydrocarbon substituents, as in the case of nitro-propane. Labile hydrogens may also be present in the compound as a reactive methylene group, —$CH_2$—, wherein the methylene group is linked to a carbon atom comprising a carbonyl or ester group as in the case of diethyl malonate, or a conjugated double bond as in the case of cyclopentadiene. Furthermore, the labile hydrogen may be present, for example, as a reactive methyl group, —$CH_3$, wherein the hydrogens are activated by the fact that the methyl group is adjacent to a carbonyl group, as in the case of acetone. Additional examples of compounds having labile hydrogen atoms are fluorene, indene, anthrone, the fulvenes, malonamides, cyanacetic esters, benzyl sulfonamides, benzyl cyanide, acetophenone, p-brom-acetophenone, p-methyl-acetophenone and p-alkoxy-acetophenones.

The reaction is conveniently effected at temperatures of —10° C. to 50° C. preferably employing an inert solvent diluent such as dioxane, tertiary butanol, ether or benzene in forming the reaction mixture. Basic catalysts which may be employed are, for example, trimethylbenzyl ammonium hydroxide, potassium hydroxide, sodium hydroxide or sodium methylate. The alpha-unsaturated ketone and compound containing a labile hydrogen are preferably reacted in equimolecular ratio, a molecular equivalent of alpha-unsaturated ketone being employed for each molecular equivalent of labile hydrogen to be replaced.

In order further to illustrate my invention, but without being limited thereto, the following examples are given:

Example I 80 parts by weight of diethyl malonate and 10 parts by weight of trimethylbenzyl ammonium hydroxide are dissolved in 100 parts by weight of dioxane and, with the solution maintained at a temperature of 14° C., there are slowly added, with stirring, 70 parts by weight of methyl vinyl ketone. The temperature rises somewhat as the reaction proceeds. The addition of all the methyl vinyl ketone is completed in about one hour. The reaction mixture is cooled to a temperature of about 15° C. for about one-half hour and then permitted to stand for 2 hours at room temperature. The reaction mixture is neutralized with dilute hydrochloric acid, poured into water, the oily layer present extracted with ether, the ethereal solution dried, the ether evaporated and the oily residue fractionated. The product obtained in about 85% yield comprises a mixture of some acetoethyl-diethylmalonate and a major amount of di-acetoethyl-diethylmalonate. The former has the following structural formula:

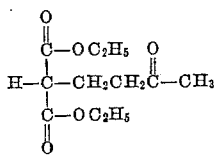

and has a boiling point of 106–110° C. at 0.25 mm. mercury pressure, a specific gravity at 25° C. of 1.0844, and an index of refraction of $1.4422_D{}^{25}$. The di-acetoethyl-diethylmalonate has the following structural formula:

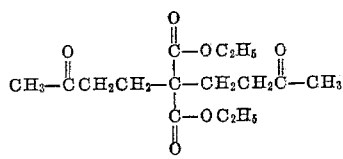

and has a boiling point of 124–130° C. at 0.2–0.3 mm. pressure, a specific gravity 1.1071 and an index of refraction of $1.4586_D{}^{25}$. This ester is a solvent for various cellulose derivatives such as cellulose nitrate, cellulose propionate, cellulose acetate and ethyl cellulose and resins such as polystyrene and certain polyvinyl compounds.

*Example II*

A solution containing about 30 parts by weight of acetone and 3 parts by weight of a 30% by weight solution of potassium hydroxide in ethanol is cooled to 0° C. 105 parts by weight of methyl vinyl ketone mixed with 30 parts by weight of tertiary butyl alcohol are added slowly with stirring over the course of 2.5 hours. The reaction mixture is poured into water, acidified with dilute hydrochloric or sulfuric acid and then extracted with chloroform. The chloroform solution is evaporated to a syrupy consistency and the liquid is poured into benzene. A flocculent solid precipitates. The solid product obtained comprises a high molecular weight reaction product in which all of the hydrogens of the acetone are replaced by

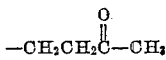

groups. In addition, about three hydrogen atoms, in all, of the added acetoethyl groups are also replaced by acetoethyl groups. The solid material obtained in about 70% yield melts at 145–150° C. and has a molecular weight of about 690. It is soluble in methanol but insoluble in ligroin and when liquid is a solvent for polystyrene, cellulose nitrate, cellulose propionate and cellulose acetate. It forms gels with ethyl cellulose and certain vinyl resins.

*Example III*

To a solution of 45 parts by weight of 2-nitropropane and 5 parts by weight of a 40% aqueous solution of trimethylbenzyl ammonium hydroxide dissolved in 50 parts by weight of dioxane at a temperature of about 25° C. are slowly added 35 parts by weight of methyl vinyl ketone. The solution is stirred during the addition which is completed over the course of about 20 minutes. The mixture is allowed to remain at room temperature for 18 hours and is then acidified and extracted with chloroform. The chloroform is evaporated from the solution and the liquid residue fractionally distilled. A yield of 70% of theoretical of 2-nitro-2-acetoethyl propane is obtained. The compound boils at 58–60° C. at 0.1 mm. of mercury pressure, has a specific gravity of 1.0605 and an index of refraction of $1.4435_D{}^{25}$. When dissolved to form a 50% by weight solution in denatured alcohol (2B), the solution obtained is a solvent for cellulose nitrate and cellulose propionate.

It is to be understood that the foregoing detailed description is given merely by way of illustration and that many variations may be made therein without departing from the spirit of my invention.

Having described my invention, what I desire to secure by Letters Patent is:

1. Process for the production of keto compounds, which comprises catalytically reacting a solution of diethyl malonate in dioxane containing trimethyl benzyl ammonium hydroxide with methyl vinyl ketone so as to replace at least one of the labile hydrogen atoms by an acetoethyl group with the formation of a carbon to carbon linkage.

2. The organic compound diethyl di-acetoethylmalonate.

BERNARD H. KRESS.

REFERENCES CITED

The following references are of record in the file of this patent:

UNITED STATES PATENTS

| Number | Name | Date |
| --- | --- | --- |
| 2,328,370 | Wiest | Aug. 31, 1943 |

OTHER REFERENCES

Beilstein, 4th ed., vol. 3, 813 (1921).

Miller: J. Chem. Soc., 1934 volume, pages 1535–1536.

Farmer: Jour. Chem. Soc., London, 1936, 1804–1809.